United States Patent [19]

Ota et al.

[11] 4,289,828
[45] Sep. 15, 1981

[54] MAGNETIC RECORDING MEDIUM AND PROCESS

[75] Inventors: Hiroshi Ota, Komoro; Eiji Horigome, Saku; Hitoshi Azegami, Tobu, all of Japan

[73] Assignee: TDK Electronics Co., Ltd., Tokyo, Japan

[21] Appl. No.: 98,242

[22] Filed: Nov. 28, 1979

[30] Foreign Application Priority Data

Nov. 30, 1978 [JP] Japan ............................. 53-147097

[51] Int. Cl.³ ............................................. B32B 27/40
[52] U.S. Cl. ........................... 428/425.9; 427/128; 427/130; 428/423.7; 428/482; 428/522; 428/694; 428/900
[58] Field of Search ............................. 427/128, 130; 428/425.9, 482, 522, 539, 900, 423.7, 694

[56] References Cited

U.S. PATENT DOCUMENTS 3,460,984  8/1969  Bisschops et al. ................. 427/128

Primary Examiner—Bernard D. Pianalto
Attorney, Agent, or Firm—Wyatt, Gerber, Shoup, Scobey & Badie

[57] ABSTRACT

A magnetic recording medium made by coating a base with a magnetic coating material which is a dispersion of magnetic particles in a binder of synthetic resins using a polyfunctional aromatic isocyanate as a curing agent, characterized by the addition of a sorbitan stearate type surface active agent which has a sorbitol derivative in the hydrophilic group. The present magnetic recording medium has superior mechanical properties, especially a superior running quality as well as superior electromagnetic properties.

4 Claims, 2 Drawing Figures

MAGNETIC RECORDING MEDIUM AND PROCESS

BACKGROUND OF THE INVENTION

This invention relates to a magnetic recording medium, and more specifically to such a medium with good running quality and surface properties.

Generally, the magnetic recording medium is made by coating polyester film or other base with a magnetic coating material which consists of magnetic particles such as powdered $\gamma\text{-Fe}_2\text{O}_3$ dispersed in macromolecular resin binder. The nature of the magnetic coating used has important bearings not only upon the running quality and other physical properties but also upon the magnetic characteristic of the medium that is related to the dispersibility of the magnetic particles and other factors, and this nature largely depends on the binder and other additives employed. Also, the physical and electromagnetic properties of the product are closely interrelated. A variety of binders for magnetic coating materials have hitherto been introduced, but none have proved fully satisfactory.

Ordinarily, for the preparation of magnetic coating materials, good dispersibility is hardly attained because the powdered magnetic material, such as $\gamma\text{-Fe}_2\text{O}_3$, are generally hydrophilic while the lacquers for dispersing them are lipophilic (oleophilic). To improve the dispersibility, surface active agents have been extensively used in mixing magnetic powders with lacquers or resin coating materials. With such an agent the dispersion effect is obtained with relative ease.

It is well-known that curable resins as binders can impart good physical and electrical properties to magnetic coating materials. When such a magnetic coating material is cured by the addition of a polyfunctional aromatic isocyanate, the additional use of a surface active agent as a dispersant will bring various drawbacks. This is because the surface active agent will prematurely react with the isocyanate before the latter reacts with the active radical of the resin, with the consequence that the inadequate curing of the binder confers unsatisfactory physical properties on the resulting recording medium such as a magnetic tape. In particular, the lubrication effects (low friction and high running quality) and surface toughness (low abrasion) which are otherwise given by the curable binder will be insufficient.

BRIEF SUMMARY OF THE INVENTION

The present invention aims at overcoming the foregoing drawbacks and, in accordance with the invention, the properties, especially the lubricity and wear resistance, of the magnetic recording medium are improved by adding as a dispersant a sorbitan stearate type surface active agent having a sorbitol derivative in the hydrophilic group to a curable binder using a polyfunctional aromatic isocyanate as a curing agent.

The present invention provides a magnetic recording medium made by coating a base with a magnetic coating material which is a dispersion of magnetic particles in a binder of synthetic resins using a polyfunctional aromatic isocyanate as a curing agent, characterized by the addition of a sorbitan stearate type surface active agent which has a sorbitol derivative in the hydrophilic group.

The present invention further provides a process for manufacturing a magnetic recording medium, which comprises preparing a liquid dispersion containing magnetic particles, a curable binder, a solvent and a dispersant, said curable binder containing groups reactive with a polyfunctional aromatic isocyanate, said dispersant being sorbitan stearate type surface active agent which has a sorbitol derivative in the hydrophilic group, adding said isocyanate to said dispersion, coating a base with said dispersion and curing the same.

DETAILED DESCRIPTION OF THE INVENTION

The invention will be more fully described below in connection with examples thereof.

Compositions A, B, C, and D of recipes to be given later were prepared. To equal portions of each composition were added varied amounts of sorbitan distearate, with increments of 0.5 PHR from zero onward (0.5 PHR being equal to 0.5 wt%) on the basis of the resin content of the composition. Each mixture was thoroughly mixed for dispersion in a ball mill and, with the addition of five parts by weight of a polyfunctional aromatic isocyanate (marketed under the trade designation "Desmodur L" by Sumitomo Bayer Urethane Co.), the whole mixture was mixed with agitation for thorough dispersion. The resultant was applied on a 12μ thick base of polyethylene terephthalate to form a coating layer 6μ thick when dried solid. After surface processing (calendering), the coating was heat treated for curing at 60° C. for 48 hours, and then the coated base was slitted to form a magnetic tape.

| Composition A | |
|---|---|
| γ-Fe₂O₃ powder (cobalt-doped) | 100 parts by weight |
| Vinyl chloride-vinyl acetate copolymer (marketed under the trade designation "OH-DEX" by Denki Kagaku Kogyo) (contg. over 10% vinyl alcohol) | 13 parts by weight |
| Polyester resin ("Desmophen 1800" by Sumitomo Bayer Urethane) | 20 parts by weight |
| Methyl ethyl ketone | 100 parts by weight |
| Methyl isobutyl ketone | 100 parts by weight |
| Toluene | 100 parts by weight |
| Composition B | |
| γ-Fe₂O₃ powder (cobalt-doped) | 100 parts by weight |
| Vinyl chloride-vinyl acetate copolymer ("VAGH" by Union Carbide Corp.) | 20 parts by weight |
| Polyester resin ("Nippollan 4032" by Nippon Polyurethane Ind.) | 13 parts by weight |
| Methyl ethyl ketone | 100 parts by weight |
| Methyl isobutyl ketone | 100 parts by weight |
| Toluene | 100 parts by weight |
| Composition C | |
| γ-Fe₂O₃ powder (cobalt-doped) | 100 parts by weight |
| Vinyl chloride-vinyl acetate copolymer ("VAGH" by UCC) | 20 parts by weight |
| Polyurethane resin ("Nippollan 5033" by Nippon Polyurethane Ind.) | 13 parts by weight |
| Methyl ethyl ketone | 100 parts by weight |
| Methyl isobutyl ketone | 100 parts by weight |
| Toluene | 100 parts by weight |

-continued

Composition D
| | |
|---|---|
| γ-Fe$_2$O$_3$ powder (cobalt-doped) | 100 parts by weight |
| Vinyl chloride-vinyl acetate copolymer ("OH-DEX" by Denki Kagaku Kogyo) (contg. over 10% vinyl alcohol) | 13 parts by weight |
| Polyurethane resin ("Nippollan 5034" by Nippon Polyurethane Ind.) | 20 parts by weight |
| Methyl ethyl ketone | 100 parts by weight |
| Methyl isobutyl ketone | 100 parts by weight |
| Toluene | 100 parts by weight |

Figure 1:
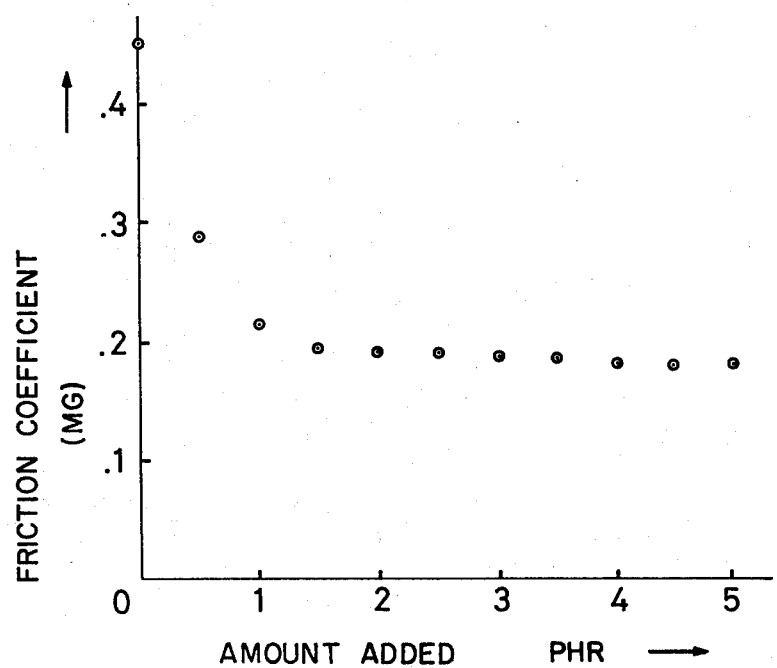
FIG. 1 is a graph in which the friction coefficient of a magnetic recording medium embodying the invention is plotted against the quantity of sorbitan distearate added to the magnetic coating.

FIG. 1 shows the relation between the quantity of sorbitan distearate added to Composition A and the friction coefficient of the resulting tape. It will be clear from the graph that the addition of sorbitan distearate markedly reduces the friction coefficient and that the effect reaches a peak with the addition of about 2 PHR and further addition beyond that is of little significance.

Figure 2:
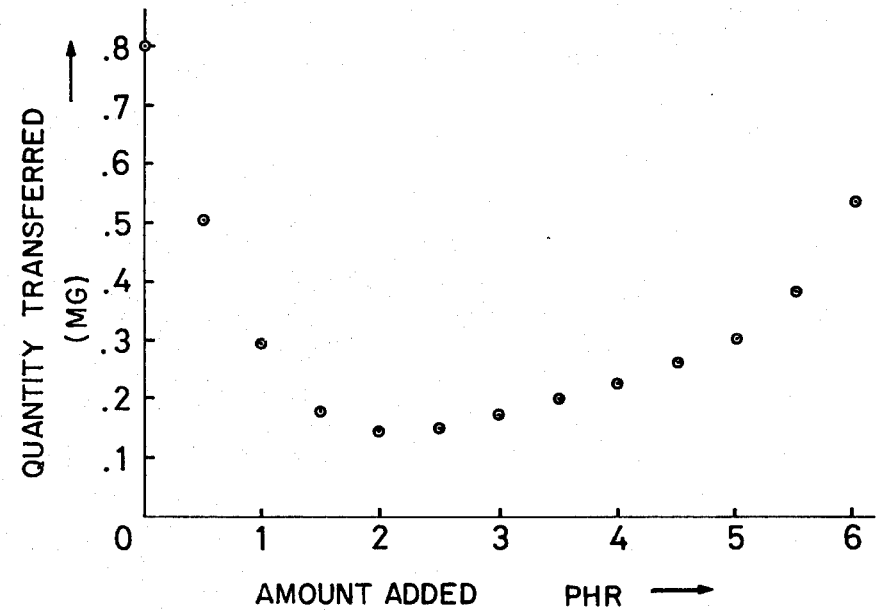
FIG. 2 is a graph in which the quantity of magnetic coating transferred from the magnetic recording medium of the invention to, and deposited on, a magnetic head is plotted against the quantity of sorbitan distearate added to the coating.

FIG. 2 shows the relation between the quantity of sorbitan distearate added to Composition A and the quantity of transfer of the resulting coating. By the "quantity of transfer" is meant the quantity of the magnetic coating (in milligrams) that came off from the magnetic tape and deposited on the magnetic head after a continuous run for 20 days in a commercially available auto stereophonic system (under the conditions of 20° C. and 60% RH). As can be seen from the graph, the quantity of transfer decreases sharply with the addition of sorbitan distearate but the favorable effect dwindles as the addition excess 5 or 6 PHR. This means that there is a certain desirable range for the quantity of sorbitan distearate to be added. The results of experiments conducted with Compositions B, C, and D were substantially the same as with Composition A plotted in FIGS. 1 and 2.

Putting these results together, it is obvious that the surface active agent gives satisfactory results without impairing the reactivity of the isocyanate and the resins.

It will be understood from the foregoing that the magnetic recording medium according to the present invention is remarkably improved in surface properties (wear resistance and low friction).

What we claimed is:

1. In a magnetic recording medium comprising a base coated with mixture containing magnetizable particles dispersed in a curable synthetic resin binder and a polyfunctional aromatic isocyanate curing agent which functions by chemical reaction with the binder resin to produce a crosslinked product, the improvement which comprises the addition to said mixture of up to 6% by weight based on the weight of said resin binder of a sorbitan stearate dispersing agent.

2. A magnetic recording medium according to claim 1 wherein said synthetic resin is selected from the group consisting of vinyl chloride-vinyl acetate copolymers, polyester resins, and polyurethane resins having groups reactive with said polyfunctional aromatic isocyanate.

3. In a process for manufacturing a magnetic recording medium which comprises preparing a liquid dispersion containing magnetic particles, a curable synthetic resin binder and a solvent, said curable resin binder containing groups reactive with a polyfunctional aromatic isocyanate to produce a cross-linked product, adding said polyfunctional aromatic isocyanate to said dispersion, coating a base with said dispersion and curing the same, the improvement which comprises the addition of up to 6% by weight based on the weight of the resin binder of a sorbitan stearate dispersing agent.

4. A process according to claim 3 wherein said synthetic resin is selected from the group consisting of vinyl chloride-vinyl acetate copolymers, polyester resins, and polyurethane resins having groups reactive with said polyfunctional aromatic isocyanate.

* * * * *